United States Patent [19]

Kuretake et al.

[11] Patent Number: 5,265,903
[45] Date of Patent: Nov. 30, 1993

[54] DEVICE FOR PROTECTING A HEAD OF AN OCCUPANT

[75] Inventors: Masato Kuretake; Motonobu Kitagawa, both of Shiga, Japan

[73] Assignee: Takata Corporation, Tokyo, Japan

[21] Appl. No.: 973,946

[22] Filed: Nov. 9, 1992

[30] Foreign Application Priority Data

Nov. 22, 1991 [JP] Japan ................... 3-307679
Jan. 10, 1992 [JP] Japan ................... 4-003074

[51] Int. Cl.⁵ ............................................. B60R 21/22
[52] U.S. Cl. ............................................. 280/730
[58] Field of Search ............... 280/730, 743, 733, 728, 280/730 R, 730 A, 728 R

[56] References Cited

U.S. PATENT DOCUMENTS 2,806,737  9/1957  Maxwell .
3,703,313  11/1972  Schiesterl et al. ............ 280/733
3,894,750  7/1975  Eckels .
3,917,023  11/1975  De Rosa ....................... 280/728

FOREIGN PATENT DOCUMENTS 2151498  4/1972  Fed. Rep. of Germany .
2628815  1/1978  Fed. Rep. of Germany ...... 280/730
9211423  11/1992  Fed. Rep. of Germany .
2110459  6/1972  France .
1-204838  8/1989  Japan ........................... 280/730
3-276844  12/1991  Japan ........................... 280/728
3-281459  12/1991  Japan ........................... 280/730
2191450  12/1987  United Kingdom ............ 280/730

*Primary Examiner*—Karin L. Tyson
*Attorney, Agent, or Firm*—Kanesaka and Takeuchi

[57] ABSTRACT

A device for protecting a head of an occupant in an automobile in case of e.g. a lateral collision has an air bag assembly installed above the window beside his seat, and including an inflatable air bag capable of moving down along the window upon inflation. The device also has a member which is movable to a position along and inwardly of the window upon inflation of the bag for holding the inflated bag against retraction from its position in which it can protect the head of the person, and a member or members for moving the bag holding member to the position along and inwardly of the window.

12 Claims, 12 Drawing Sheets

DEVICE FOR PROTECTING A HEAD OF AN OCCUPANT

BACKGROUND OF THE INVENTION

1. Field of the Invention

This invention relates to a device for protecting sideways a head of an occupant in an automobile in the case of e.g. a lateral collision.

2. Description of the Related Art

In the event that, for example, an automobile has received a lateral collision, it is likely that an occupant may have his or her head struck against the window pane, roof rail, pillar, etc. beside his seat, or swung heavily sideways if the window pane is open.

There is known an air bag device which is installed beside an occupant in an automobile for protecting his or her head on such an occasion. The known device has, however, no member, for holding an inflated air bag against movement of the head or body of the occupant which has struck against it. If the window is open, therefore, the inflated air bag is moved to the outside of the automobile through the window and does not provide a firm support for the head.

OBJECT AND SUMMARY OF THE INVENTION

It is an object of this invention to provide a device which ensures the protection of a head of an occupant in an automobile by an inflated air bag held against outward movement of the head striking against it, even if the window beside him may be open.

According to a first aspect of this invention, there is provided a device for protecting the head of an occupant in an automobile which comprises an air bag assembly including an air bag located above the window beside his seat and adapted to move down upon inflation, a member which is movable to a position along the inside of the window for preventing the outward retraction or movement of the air bag, and a device for moving the member for preventing the outward retraction of the air bag to its position along the inside of the window upon inflation of the air bag.

According to a second aspect of this invention, the member for preventing the outward retraction of the air bag is a shutter located above the window.

According to a third aspect of this invention, the member for preventing the outward retraction of the air bag is a belt extending from above the rear edge of the window to below its front edge along its top and front edges, and the device for moving the member is a tensioner for stretching the belt.

According to a fourth aspect of this invention, the belt is joined to the air bag, and the tensioner is adapted to stretch the belt in the direction of movement of the inflated air bag.

According to a fifth aspect of this invention, there is provided a device for protecting a head of an occupant in an automobile which comprises an air bag assembly including an air bag located above the window beside his seat and adapted to move down upon inflation, and a linear member having a pair of ends connected to the air bag and the roof of the automobile ahead of the window, respectively. The linear member has a length which is sufficiently large to be stretched upon inflation of the air bag to prevent its outward retraction.

According to a sixth aspect of this invention, there is provided a device for protecting a head of an occupant in an automobile which comprises an air bag container located above the window beside his seat and having an opening facing the inside of the automobile, an air bag held in a folded form in the container, an inflator attached to the container for inflating the air bag, a lid covering the opening of the container, attached to the container rotatably away from its opening to a position between the window and the air bag upon inflation of the air bag, and having a base edge secured to the container adjacent to its bottom edge near the window and a rotatable edge fastened to the container at its edge remote from the window detachably therefrom for rotation about the base edge, and a member associated with the lid for holding it against rotation beyond its position between the window and the inflated air bag.

According to a seventh aspect of this invention, the member for holding the lid against rotation is a linear one extending between the lid near its rotatable edge and the roof of the automobile, and having a length which is sufficiently large to be fully stretched upon arrival of the lid at its position between the window and the inflated air bag. The linear member is preferably a string, or strap.

The inflator supplies gas into the air bag to inflate it upon bearing of a large external force sideways on the automobile as a result of e.g. a lateral collision. The inflated air bag spreads downward along the window near the occupant in the automobile. The member for preventing the outward retraction of the air bag holds the inflated air bag against outward retraction, or movement away from the occupant, and enables the air bag to provide a firm support for his head against any undesirable sideways movement, even if the window may be open.

In the device according to the second aspect of this invention, the shutter is moved down along the window upon inflation of the air bag to lie between the window and the inflated air bag and thereby prevent the outward retraction of the air bag.

In the device according to the third aspect of this invention, the belt is fully stretched along the window upon inflation of the air bag to lie between the window and the inflated air bag and thereby prevent the outward retraction of the air bag.

In the device according to the fourth aspect of this invention, the belt is fastened to the air bag by e.g. sewing, and therefore, holds the inflated air bag against displacement and thereby against retraction from the occupant to be protected. Moreover, the belt pulls the air bag in the direction of its spreading movement and thereby ensures its smooth spreading.

In the device according to the fifth aspect of this invention, the linear member, e.g. a belt, is fully stretched upon inflation of the air bag to pull the inflated air bag inwardly and thereby prevent its outward retraction.

In the device according to the sixth aspect of this invention, the air bag pushes the lid open, as it is inflated. The lid is rotated by the air bag about its own base edge toward the window until it becomes suspended from the bottom edge of the container along the window and between the window and the inflated air bag. The member for holding the lid against rotation is fully stretched to hold the lid against rotation beyond its suspended position, so that the lid may hold the inflated air bag against outward retraction when the head of the occupant to be protected has struck against the air bag. Thus, the air bag provides a firm support for the head against any undesirable sideways movement, even if the window may be open.

In the device according to the seventh aspect of this invention, the linear member, e.g. a belt, or strap, holds the lid against rotation beyond its suspended position between the window and the inflated air bag.

DESCRIPTION OF THE PREFERRED EMBODIMENTS

Figure 1:
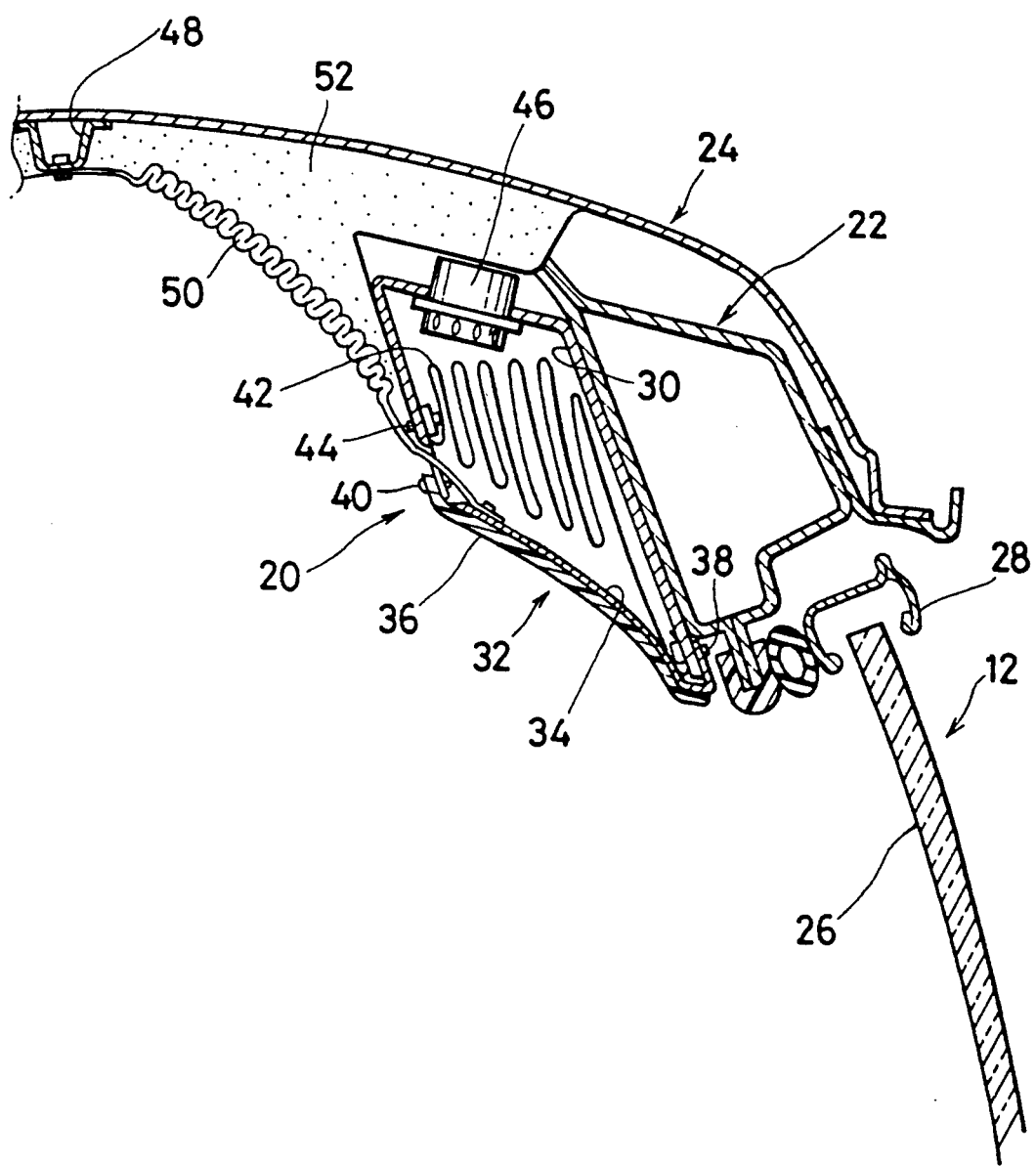
FIG. 1 is a vertical sectional view of a device embodying this invention as mounted in an automobile.

Reference is first made to FIGS. 1 to 6 of the drawings showing a device embodying this invention which comprises an air bag assembly for protecting a head of an occupant in an automobile. The automobile includes a windshield 10, a door 12, a front pillar 14, a side member 22, a roof 24 and a door frame 28. The door 12 has a window fitted with a pane 26 of glass. The air bag assembly 20 is installed above the door 12.

The air bag assembly 20 includes a container 30 secured to the outer surface of the side member 22 facing the interior of the automobile. The container 30 has at its bottom an opening covered with a lid 32. The lid 32 comprises a metal plate 34 covered with a synthetic resin coating 36. The metal plate 34 has a base edge located near the door 12 and fastened to the container 30 adjacent to the bottom edge of its opening with rivets 38. The lid 32 has a rotatable edge located on the opposite side of the metal plate 34 away from its base edge and fastened to the container 30 at the top edge of its opening with rivets 40 to allow the lid 32 detach from the container 30. This detachable fastening can be made by, for example, the provision of slits which are open at the edge of the lid 32, and in which the rivets 40 are received when the lid 32 is closed.

The container 30 holds an air bag 42 in its folded shape. The air bag 42 is fastened to the container 30 with the rivets 38 and another set of rivets 44. The container 30 is provided with an inflator 46 for inflating the air bag 42 upon detection by a sensor in the automobile of an acceleration which is higher than a predetermined rate.

A bracket 48 is attached to the roof 24, and spaced apart from the air bag assembly 20. A strap 50 as a linear member extends from the bracket 48 to the lid 32 near its rotatable edge and has a pair of ends fastened to them, respectively. The strap 50 normally remains folded or contracted, and lies along the inner surface of a roof lining 52, as shown in FIG. 1.

Figure 2:
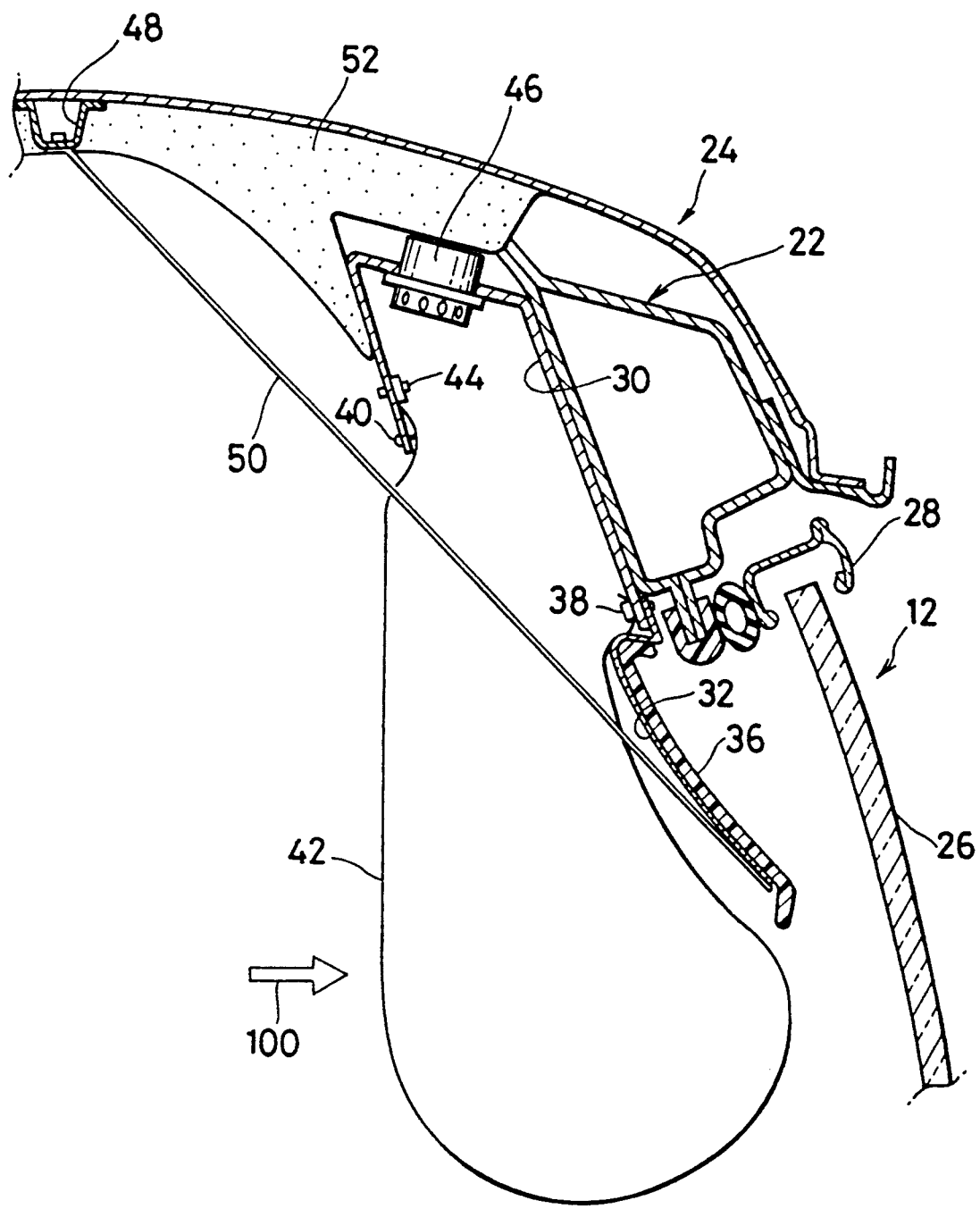
FIG. 2 is a vertical sectional view of the device in its working position.
Figure 3:
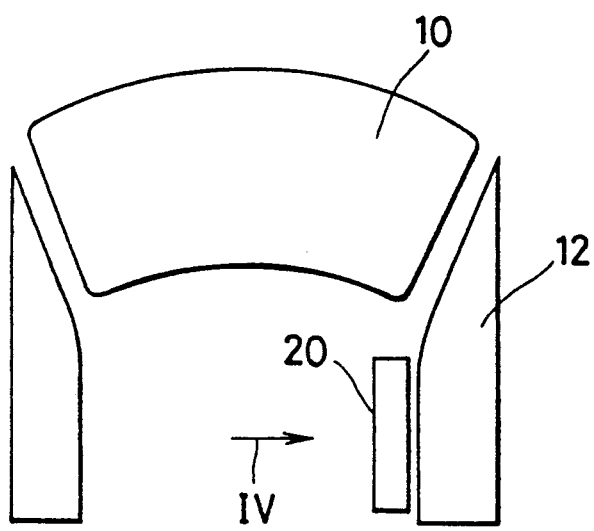
FIG. 3 is a schematic top plan view of a part of the automobile equipped with the device.
Figure 4:
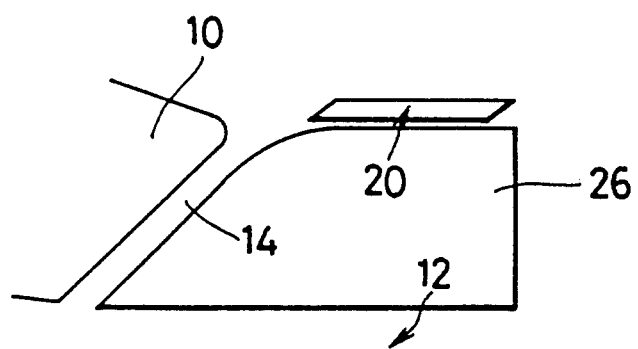
FIG. 4 is a view taken along the arrow IV in FIG. 3.
Figure 5:
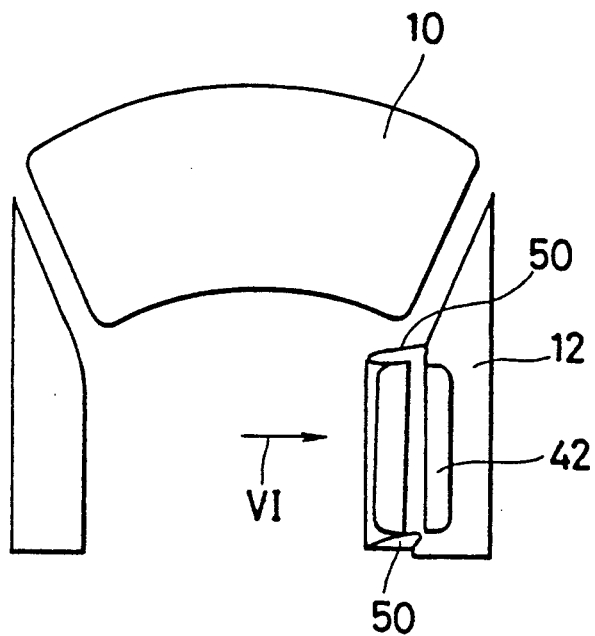
FIG. 5 is a view similar to FIG. 3, but showing the device in its working position.
Figure 6:
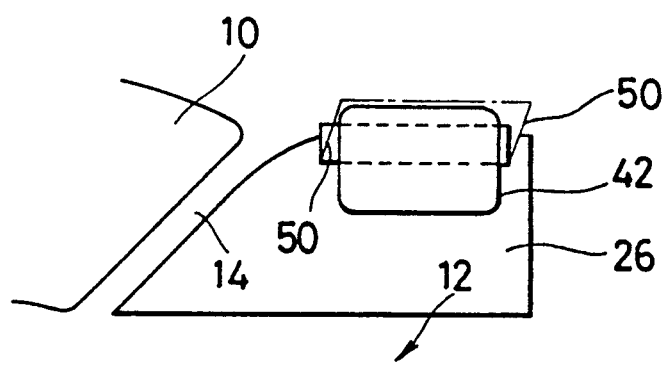
FIG. 6 is a view taken along the arrow VI in FIG. 5.

In operation, the inflator 46 is actuated to inject gas into the container 30 as soon as the automobile receives a large sideways force from e.g. a lateral collision. The air bag 42 is thereby inflated and forces the lid 32 to open toward the interior of the automobile. The lid 32 is rotated about its base edge near the rivets 38 and the strap 50 is thereby stretched, while the inflated air bag 42 moves down. As soon as the air bag 42 is fully inflated, the lid 32 becomes suspended from the container 30 between the window pane 26 and the air bag 42 and the strap 50 becomes fully stretched to hold the lid 32 against further rotation toward the window pane 26, so that the lid 32 may provide a firm support for the air bag 42 in the event that the head of the occupant to be protected has struck against the air bag 42 in the direction of an arrow 100 as shown in FIG. 2. Thus, the device can reliably protect the head of the occupant in the automobile, even if the window pane 26 may be open, since the air bag 42 is held by the lid 32 against displacement out of the window.

Figure 7:
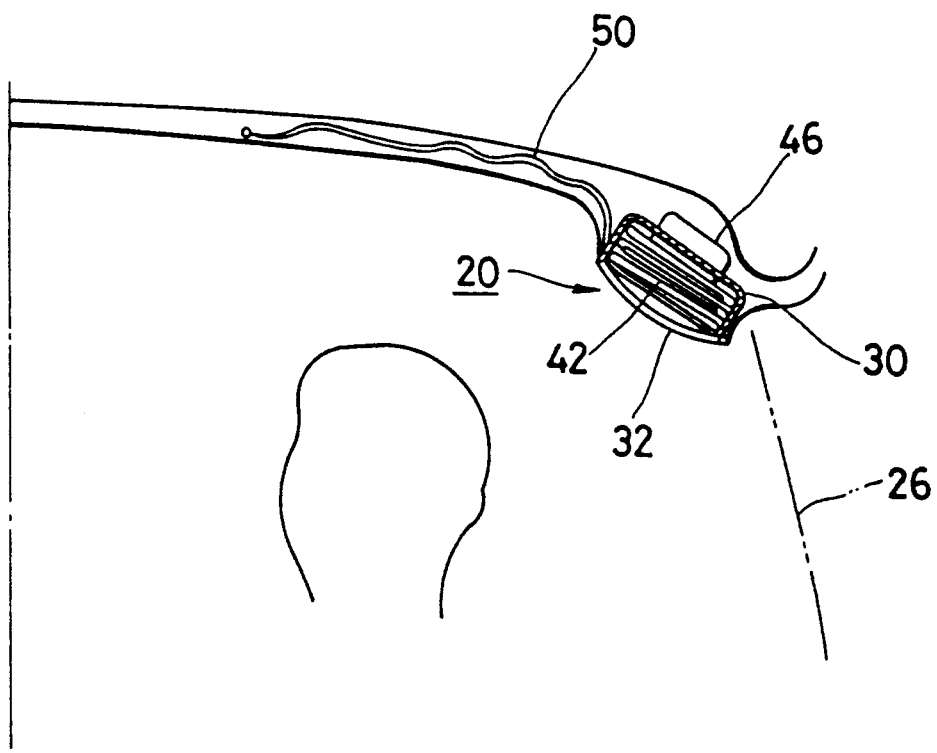
FIG. 7 is a vertical sectional view of a device according to another embodiment of this invention.
Figure 8:
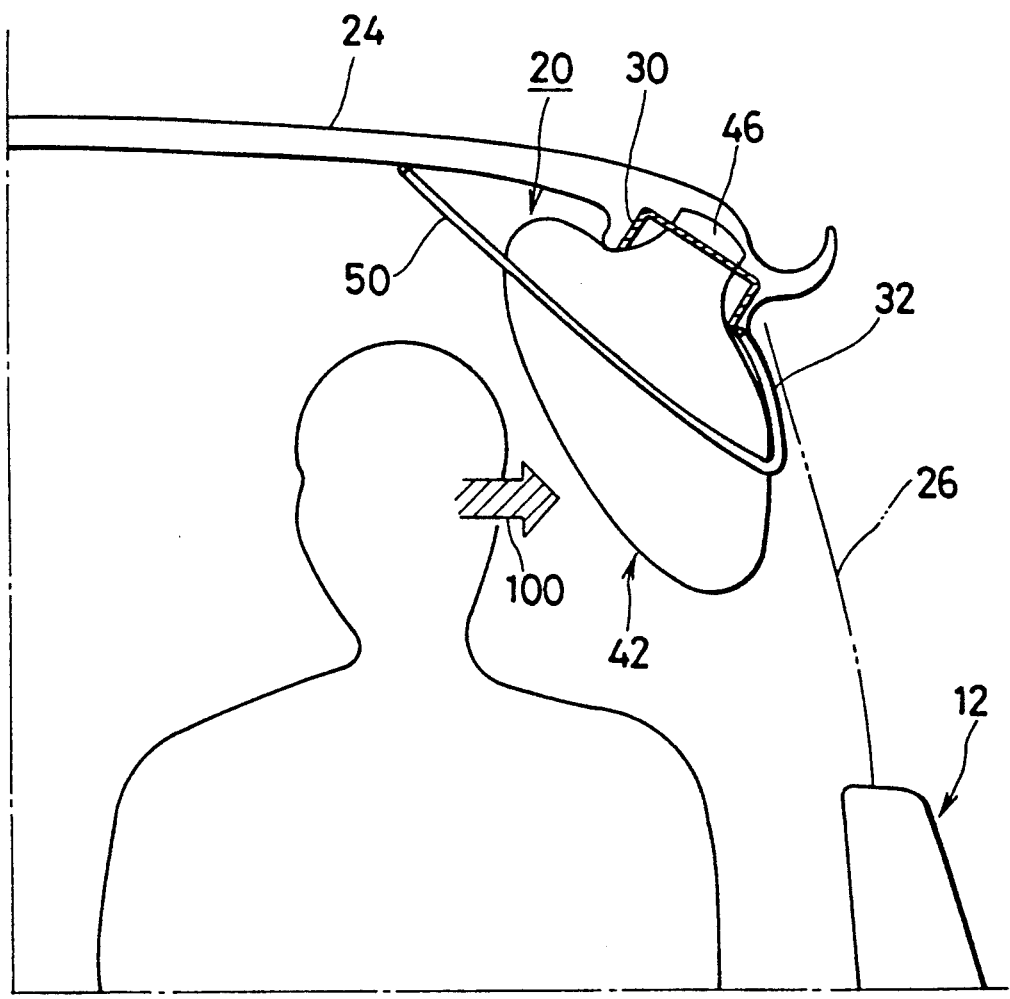
FIG. 8 is a view similar to FIG. 7, but showing the device in its working position.

Although the air bag assembly 20 has been shown and described as being installed on the side member 22, it is also possible to utilize the inside of a side member as a space for the installation of the air bag assembly 20, as shown in FIG. 7. FIGS. 7 and 8 show a device installed in a hardtop type automobile in which the door 12 has no door frame. In any other respect, however, the device is substantially identical in construction and operation to that shown in FIGS. 1 to 6. The lid 32 is rotated with the inflation of the air bag 42, and held against rotation beyond its desired position near and inwardly of the window pane 26 in which it supports the inflated air bag 42 against any undesirable displacement to protects the head of the occupant, as shown in FIG. 8.

Although the lid 32 has been shown and described as being held by the strap 50 against rotation beyond its desired position, it is alternatively possible to fasten the base edge of the lid 32 to the container 30 by a hinge so constructed as to hold the lid 32 against rotation beyond its desired position.

Attention is now directed to FIGS. 9 to 12 showing a device according to a different embodiment of this invention. The device comprises an air bag assembly 20A installed under the roof 24 of an automobile and above the door 12 near the seat for an occupant in the automobile. The air bag assembly 20A includes an air bag 42 and an inflator 46 for inflating it.

The device also includes a shutter 60 so installed under the roof 24 as to be movable downward along and inwardly of the window pane 26 in the door 12 by a tensioner 62 installed in the body of the automobile. A wire 64 is connected between the lower end of the shutter 60 and the tensioner 62. A pair of straps 50A are fastened at one end to the lower end of the shutter 60, while the other ends of the straps 50A are fastened to the roof 24 by brackets not shown.

Figure 11:
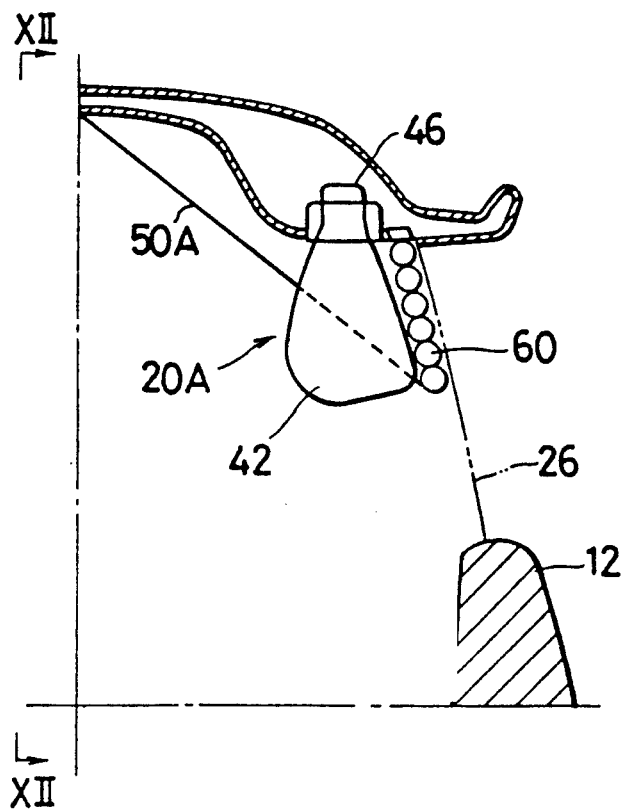
FIG. 11 is a view similar to FIG. 9, but showing the device in its working position.
Figure 12:
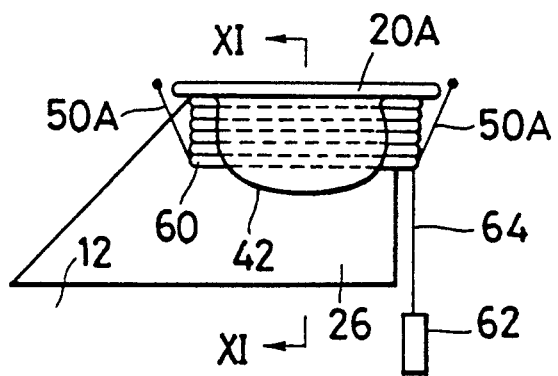
FIG. 12 is a view taken along the line XII—XII of FIG. 11.

If a large force acts sideways upon the automobile, the inflator 46 is actuated to supply gas to inflate the air bag 42 along and inwardly of the window pane 26, while the tensioner 62 is simultaneously actuated to pull down the shutter 60. The shutter 60 is pulled down by the wire 64 to its position along the window pane 26 and between the window pane 26 and the inflated air bag 42, and held against displacement away from the air bag 42 by the straps 50A which have been fully stretched, as shown in FIGS. 11 and 12. Thus, the shutter 60 holds the inflated air bag 42 against outward retraction and ensures that the air bag 42 protects the head of the occupant in the automobile, in the event that the head has struck against the air bag 42.

Figure 13:
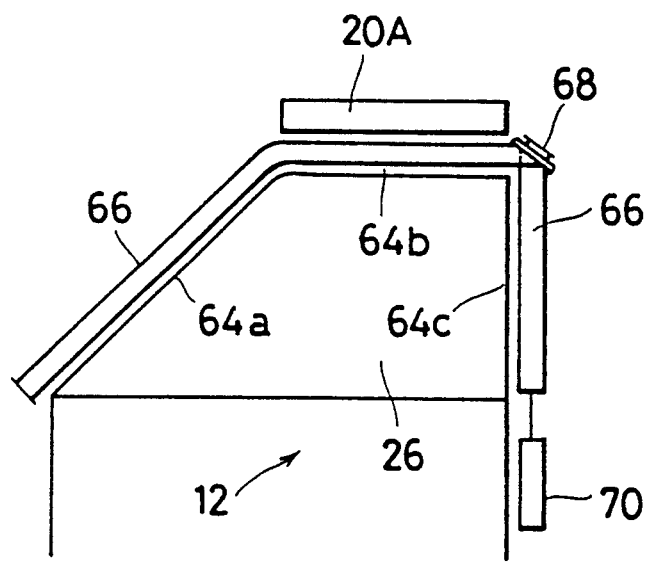
FIG. 13 is a schematic side elevational view of a device according to a different embodiment of this invention.
Figure 14:
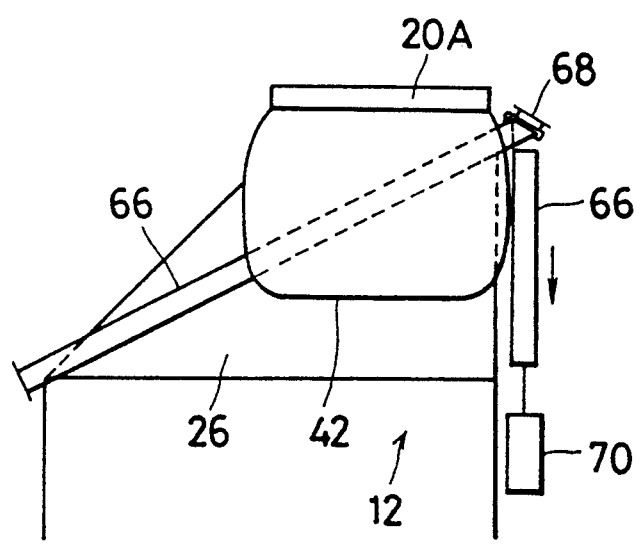
FIG. 14 is a view similar to FIG. 13, but showing the device in its working position.

A device according to a still different embodiment of this invention is shown in FIGS. 13 and 14, and comprises an air bag assembly 20A installed under the roof of an automobile and above the door 12 near the seat for an occupant in the automobile. The device also includes a belt 66 extending along the front edge 64a, top edge 64b, and rear edge 64c of the window 26 in the door 12 past a belt guide 68 attached to the automobile. The belt 66 has one end fastened to the automobile near the lower end of the front edge 64a of the window 26, while the other end of the belt 66 is connected to a tensioner 70 provided for stretching the belt 66. When an air bag 42 is inflated along and inwardly of the window 26, the tensioner 70 is actuated to stretch the belt 66 diagonally of the window 26 so that it may lie behind the inflated air bag 42, or between the window 26 and the air bag 42. The belt 66, thus, holds the inflated air bag 42 against displacement toward the window 26 and thereby ensures that the air bag 42 protects the head of the occupant which has struck against it.

Reference is now made to FIGS. 15 to 18 showing a modified form of the device shown in FIGS. 9 to 12. The modified device has no shutter 60, tensioner 62, or wire 64, but has straps 50A fastened at one end to an air bag 42 instead of to the shutter 60. It is otherwise identical in construction to the device which has been described with reference to FIGS. 9 to 12. No repeated description is, therefore, made, but reference is made to the foregoing description of FIGS. 9 to 12. If the air bag 42 is inflated along and inwardly of the window 26, the straps 50A are fully stretched to hold the inflated air bag 42 against displacement toward the window 26 and thereby ensure that the air bag 42 provides a firm protection for the head of the occupant in the automobile which has struck against it.

Figure 19:
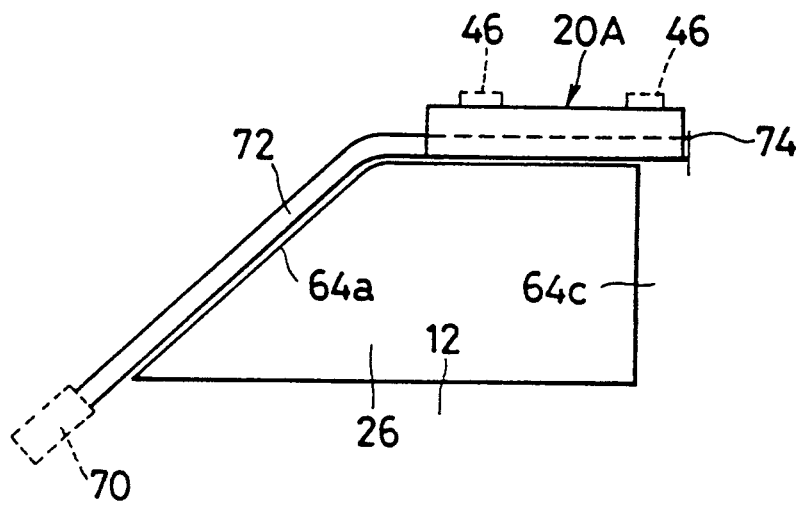
FIG. 19 is a schematic side elevational view of a device according to a still different embodiment of this invention.
Figure 20:
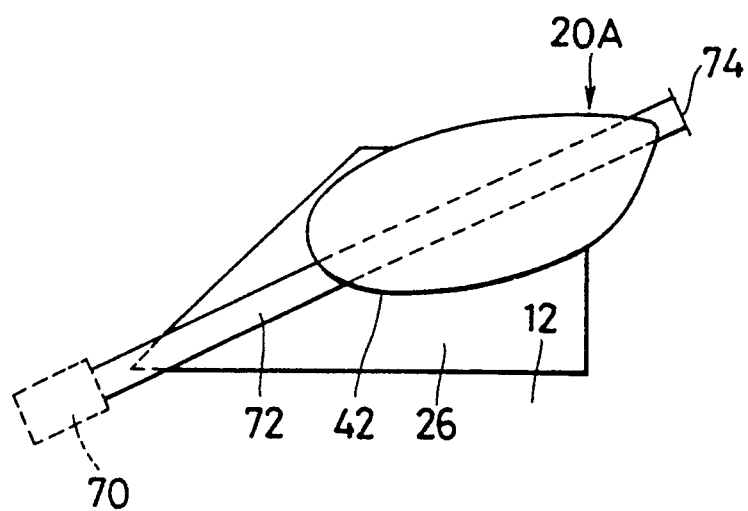
FIG. 20 is a view similar to FIG. 19, but showing the device in its working position.

FIGS. 19 and 20 show a device according to a still different embodiment of this invention. It comprises an air bag assembly 20A including an air bag 42 and inflators 46, a tensioner 70 installed below the front edge 64a of the window 26 in the door 12 near the seat for an occupant in an automobile, and a belt 72 having one end connected to the tensioner 70, while the other end of the belt 72 is fastened to a bracket 74 above the rear edge 64c of the window 26. The belt 72 extends behind the air bag 42 and the air bag 42 has a bottom portion joined by sewing to the belt 72.

If the inflator 46 is actuated, the air bag 42 is inflated and spread along and inwardly of the window 26. The tensioner 70 is actuated simultaneously with the inflator 46 to stretch the belt 72 diagonally of the window 26 from its normal position along the edges of the window 26, so that the belt 72 may hold the inflated air bag 42 against retraction toward the window 26 and enable it to provide a firm support for the head of the occupant in the automobile in the event that it has struck against the air bag 42. As the air bag 42 is joined to the belt 72, it is pulled by the belt 72 when the belt 72 is stretched by the tensioner 70. This ensures that the air bag 42 be smoothly inflated and spread, and provides a very reliable support for the head to be protected without being displaced from the belt 72.

The tensioner 62 or 70 as hereinabove described can be used also as a pretensioner for a seat belt device.

As is obvious from the foregoing description, the device of this invention provides a reliable support for a head of an occupant to be protected without having the inflated air bag displaced outwardly of the automobile by the head striking against it, even if the window may be open.

Figure 9:
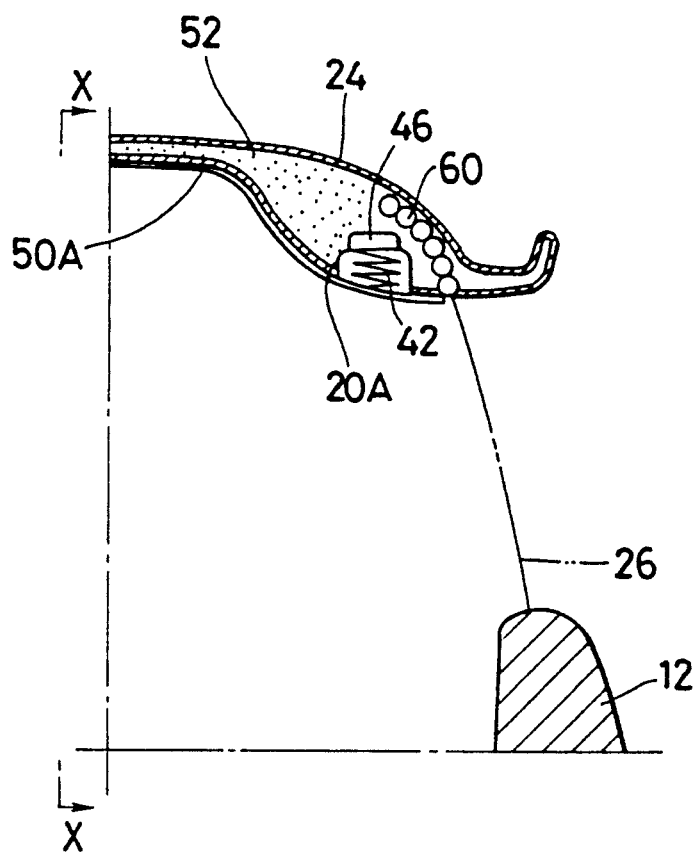
FIG. 9 is a vertical sectional view of a device according to still another embodiment of this invention.
Figure 10:
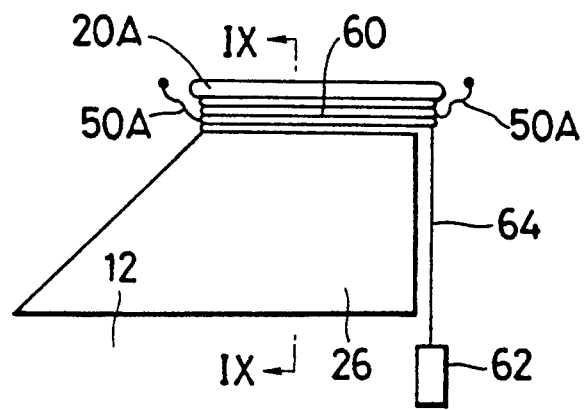
FIG. 10 is a view taken along the line X—X of FIG. 9.
Figure 15:
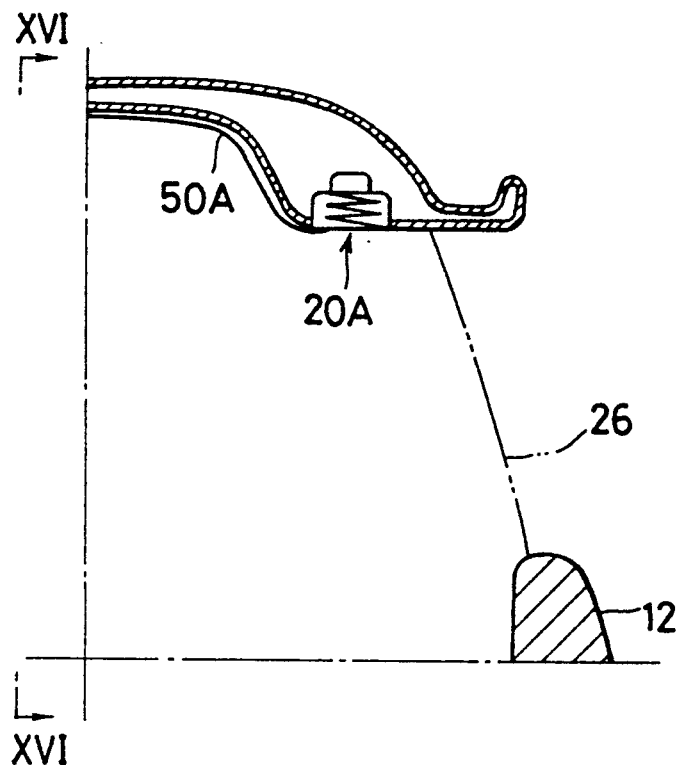
FIG. 15 is a vertical sectional view of a device taken along XV—XV line of FIG. 16 according to a different embodiment of this invention.
Figure 16:
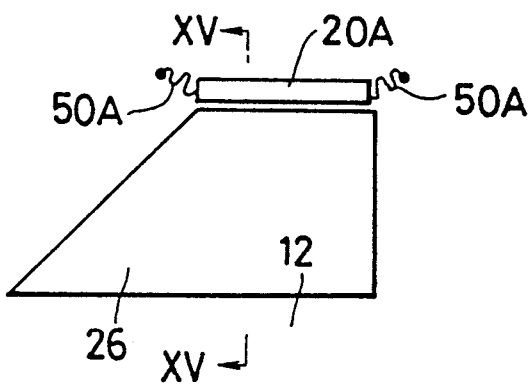
FIG. 16 is a view taken along the line XVI—XVI of FIG. 15.
Figure 17:
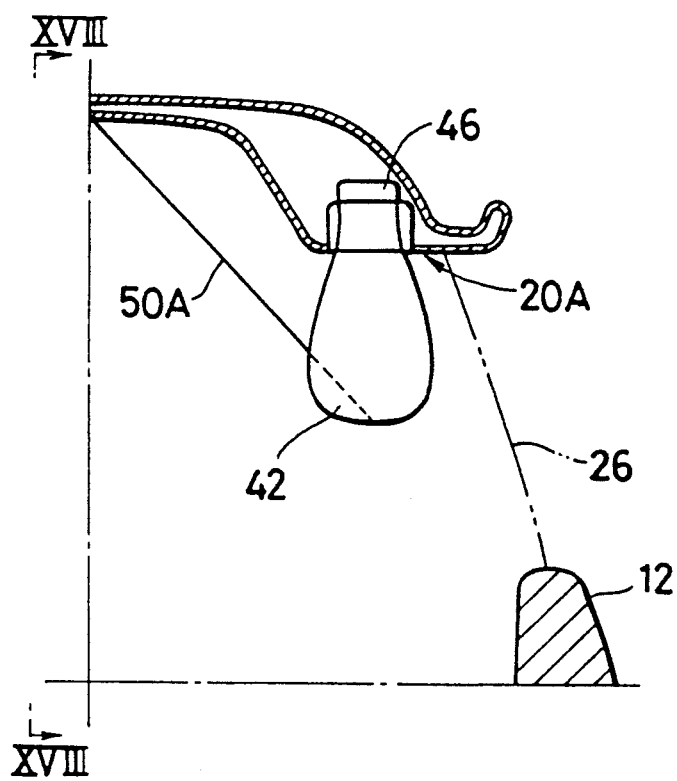
FIG. 17 is a vertical sectional view taken along XVII—XVII line of FIG. 18, which shows a view similar to FIG. 15, but showing the device in its working position.
Figure 18:
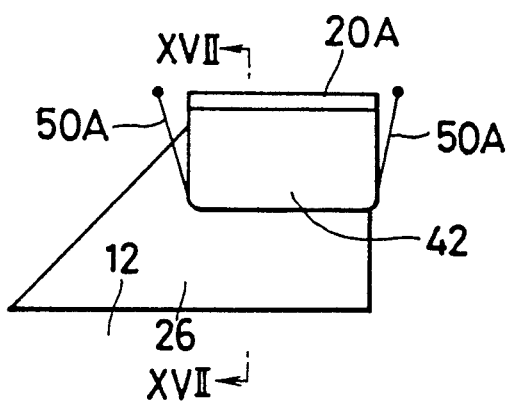
FIG. 18 is a view taken along the line XVIII—XVIII of FIG. 17.

The shutter as shown in FIG. 9 has the advantage of, among others, providing a very reliable support for the inflated air bag, as it occupies a wide area along the window. The device including a belt, or strap as a support for the inflated air bag, as shown in FIG. 13 or 15, has the advantage of, among others, being light in weight. The joining of the air bag to a belt, as shown in FIG. 19, has the advantage of enabling the air bag to be inflated and spread very smoothly. The lid as shown in FIG. 1 has the advantage of providing a reliable support for the inflated air bag, and the combination of the lid with a string, belt, or strap ensures the holding of the lid against rotation beyond its desired position.

What is claimed is:

1. A device for protecting a head of an occupant in an automobile, comprising:

an air bag assembly installed above a window beside an occupant's seat in the automobile, and including an inflatable air bag capable of moving down along said window upon inflation of the air bag, a member movable to a position along and inwardly of said window upon inflation of said air bag for holding said inflated air bag against retraction from a position in which the air bag protects the head of the occupant, said member including a shutter installed above said window, and means for moving said member for holding said inflated air bag to the position along and inwardly of the window, said means pulling down said shutter to an upper portion of said window.

2. A device as set forth in claim 1, wherein said air bag assembly is installed on a side member of the automobile.

3. A device as set forth in claim 1, wherein said air bag assembly is installed within a side member of the automobile.

4. A device as set forth in claim 1, further comprising means for holding said shutter in a position along and inwardly of said window.

5. A device as set forth in claim 4, wherein said means for holding said shutter comprises at least one linear member extending between said shutter and the roof of the automobile, and having a length which is sufficiently large to allow said member to be fully stretched upon arrival of said shutter at said position thereof.

6. A device for protecting a head of an occupant in an automobile, comprising:

an air bag assembly installed above a window beside an occupant's seat in the automobile, and including an inflatable air bag capable of moving down along said window upon inflation of the air bag, a member movable to a position along and inwardly of said window upon inflation of said air bag for holding said inflated air bag against retraction from a position in which the air bag protects the head of the occupant, said member including a belt extending from above a rear edge of the window to below a front edge of the window along a top edge and the front edge of the window, and means for moving said member for holding said inflated air bag to the position along and inwardly of the window, said means including a tensioner for stretching said belt.

7. A device as set forth in claim 6, wherein said belt is joined to said bag so as to pull it down when said belt is stretched by said tensioner.

8. A device as set forth in claim 6, wherein said air bag assembly is installed on a side member of the automobile.

9. A device as set forth in claim 6, wherein said air bag container is installed within a side member of the automobile.

10. A device for protecting a head of an occupant in an automobile comprising:

an air bag assembly installed above a window beside an occupant's seat in the automobile, and including an inflatable air bag capable of moving down along said window upon inflation of the air bag; and at least one linear member having one end fastened to said bag, and the other end fastened to a roof of the automobile remote from said window, said member having a length which is sufficiently large to be fully stretched upon inflation of said bag and to hold said inflated bag against retraction from its position in which it can protect the heat of said occupant.

11. A device as set forth in claim 10, wherein said air bag assembly is installed on a side member of the automobile.

12. A device as set forth in claim 10, wherein said air bag assembly is installed within a side member of the automobile.

* * * * *